UNITED STATES PATENT OFFICE.

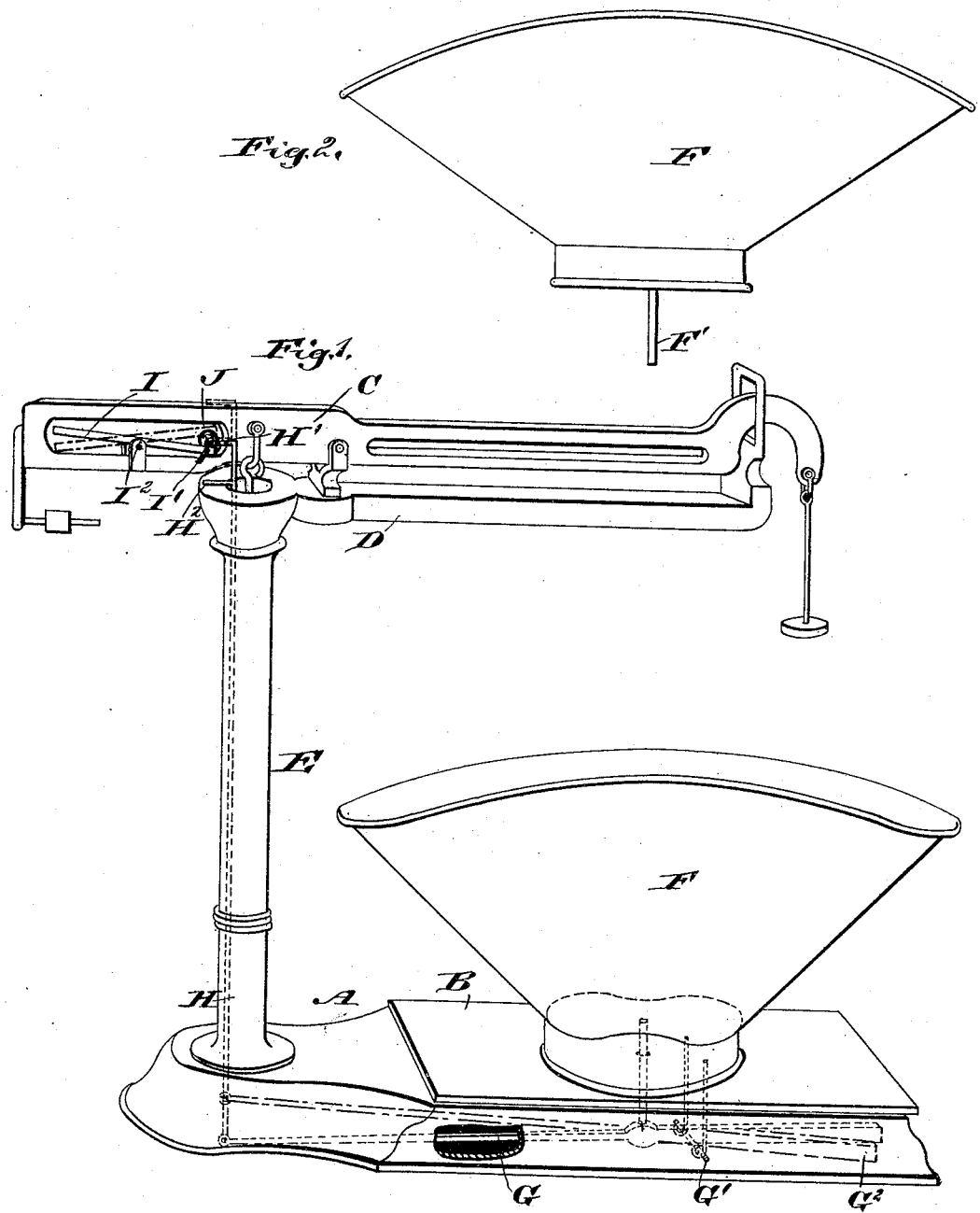

JOHN P. FIRTH, OF TITUSVILLE, PENNSYLVANIA.

WEIGHING-SCALE.

SPECIFICATION forming part of Letters Patent No. 488,882, dated December 27, 1892.

Application filed July 7, 1892. Serial No. 439,192. (No model.)

*To all whom it may concern:*

Be it known that I, JOHN P. FIRTH, of Titusville, in the county of Crawford and State of Pennsylvania, have invented certain new and useful Improvements in Weighing-Scales, of which the following is a full, clear, and exact description.

The invention relates to weighing scales on which a scoop is used on a platform for weighing articles.

The object of the invention is to provide certain new and useful improvements in weighing scales, whereby the scale is automatically adjusted when the scoop is placed on the platform or removed therefrom, so that in either case the scale is properly balanced.

The invention consists of a beam journaled on the scale beam and provided with a running weight, and a weighted lever adapted to be actuated by the scoop and connected with the said beam.

The invention also consists of certain parts and details and combinations of the same, as will be hereinafter described and then pointed out in the claims.

Reference is had to the accompanying drawings forming a part of this specification, in which similar letters of reference indicate corresponding parts in all the figures.

Figure 1 is a perspective view of the improvement; and Fig. 2 is a side elevation of the scoop.

The weighing scale of any approved construction is provided with the usual base A, the platform B, connected with the scale beam C, fulcrumed on an arm D, projecting from the post E, erected on the base A. The scoop F, to be set on the platform B is provided on its bottom with a downwardly-extending pin F', adapted to pass loosely through an opening formed in the platform B. The lower end of this pin F' is adapted to press a lever G, extending longitudinally in the base A and fulcrumed on the platform at G', the rear end $G^2$ of the lever being weighted so as to hold the lever normally in an uppermost position, that is at the time the pin F' of the scoop F does not engage the said lever.

The forward end of the lever G is pivotally-connected with a rod H, which extends through the post E and is provided at its upper end with two arms or lugs H' and $H^2$, adapted to alternately engage a pin I', formed at one end of a beam I, fulcrumed at $I^2$ to the rear end of the scale beam C. On this beam I is arranged a running weight J, preferably made in the shape of a ball traveling on a suitable track formed in the top of the beam; but instead of the said ball a fluid, liquid or other substance may be used to accomplish the same purpose, that is, to travel from one end of the beam to the other when the latter is inclined.

The operation is as follows: When the scoop F is removed from the platform B then the weighted end $G^2$ of the lever G throws the forward end of the latter upward so that the rod H by its pin $H^2$ engages the pin I', lifts the latter, thus swinging the beam I into the position shown in dotted lines in Fig. 1, the weight J then running to the outer lower end of the said beam. The scale beam C is now counterbalanced for weighing articles directly on the platform B. Now, when it is desired to use the scoop F for weighing articles, then the scoop is placed on the platform with the pin passing through the opening therein to engage and press the lever G into a lowermost position as shown in full lines in Fig. 1. By thus actuating the lever G, the rod H is caused to move downward thus tilting the beam I to the position shown in full lines in Fig. 1, the running weight J passing to the lower end of the said beam, that is near to the fulcrum of the scale beam C to counterbalance the latter by thus compensating for the additional weight of the scoop.

It is understood that moving the running weight J nearer to the fulcrum of the scale beam C compensates for the additional weight of the scoop. The moment the scoop is removed from the platform B, then the lever G swings back to its normal position, owing to the weighted end $G^2$, as above described.

It will be seen that by this device the scale beam is always counterbalanced whether the scoop is placed on the platform or removed therefrom.

Having thus fully described my invention, I claim as new and desire to secure by Letters Patent,—

1. The combination with a pivoted scale beam, of a second beam pivoted upon and carried by the scale beam and having a running or traveling weight, and a lever adapted to be actuated by the placing of a scoop on the weighing platform and connected with said second beam, substantially as set forth.

2. An attachment for weighing scales, comprising a weighted lever adapted to be actuated by the scoop, a rod pivotally connected with the said lever and provided with lugs, and a beam journaled on the scale beam and provided with a running weight, the said beam being actuated by the lugs on the said rod, substantially as shown and described.

3. In an attachment for weighing scales, the combination with a scoop provided with a pin, of a lever adapted to be engaged by the said pin, and a beam journaled on the scale beam and provided with a running weight, the said beam being actuated from the said lever, substantially as shown and described.

4. In an attachment for weighing scales, the combination with a scoop provided with a pin, of a lever adapted to be engaged by the said pin, a beam journaled on the scale beam and provided with a running weight, the said beam being actuated from the said lever, and intermediate connection between the said lever and the said beam, substantially as shown and described.

5. The combination with a platform scale of an automatically shifted or actuated scoop-counterbalance or compensator mounted on the scale beam, and a lever mechanism connected with it and extending adjacent to the platform and actuated by the placing of a scoop upon, or its removal from, the said platform; whereby the said scoop-counterbalance or compensator will be automatically shifted or actuated to balance the scale beam during the presence or absence of the scoop, substantially as set forth.

JOHN P. FIRTH.

Witnesses:
ALONZO ROBISON,
J. J. HOLDEN,